United States Patent
Karlsson et al.

(10) Patent No.: US 7,931,560 B2
(45) Date of Patent: Apr. 26, 2011

(54) METHOD AND ARRANGEMENT FOR ADAPTING SHIFTING STRATEGIES IN A HEAVY VEHICLE INCLUDING AN AUTOMATED TRANSMISSION AND EXPERIENCING A PTO LOAD

(75) Inventors: Svante Karlsson, Västra Frölunda (SE); Erik Lauri, Mölndal (SE)

(73) Assignee: Volvo Lastvagnar AB, Göteborg (SE)

( * ) Notice: Subject to any disclaimer, the term of this patent is extended or adjusted under 35 U.S.C. 154(b) by 621 days.

(21) Appl. No.: 12/064,999

(22) PCT Filed: Sep. 8, 2006

(86) PCT No.: PCT/SE2006/001031
§ 371 (c)(1),
(2), (4) Date: Feb. 27, 2008

(87) PCT Pub. No.: WO2007/030070
PCT Pub. Date: Mar. 15, 2007

(65) Prior Publication Data
US 2008/0234102 A1 Sep. 25, 2008

Related U.S. Application Data

(60) Provisional application No. 60/596,209, filed on Sep. 8, 2005.

(51) Int. Cl.
*B60W 10/06* (2006.01)
*B60W 10/10* (2006.01)
(52) U.S. Cl. .......................................... 477/111
(58) Field of Classification Search .................. 477/34
See application file for complete search history.

(56) References Cited

U.S. PATENT DOCUMENTS 5,582,069 A * 12/1996 Genise ..................... 74/335

(Continued)

FOREIGN PATENT DOCUMENTS

GB 2301638 A 12/1996

(Continued)

OTHER PUBLICATIONS

International Search Report for corresponding International Application PCT/SE2006/001031.

(Continued)

*Primary Examiner*—Edwin A. Young
(74) *Attorney, Agent, or Firm*—WRB-IP LLP

(57) ABSTRACT

Method and arrangement for adjusting shift characteristics of a transmission of a heavy vehicle. A heavy vehicle is operated and that is powered by an internal combustion engine equipped with an automated manual transmission and a power take off. The power take off, when operating, imposes a torque-consuming load on the engine. Operation of the power take off is detected when the engine of the vehicle is in a power mode. At least one gear-shift event is adapted to occur at a higher engine speed when power take off operation is detected than when power take off operation is not detected. The gear-shift event is affected at an engine speed that is approximately five to twenty-five percent higher than when power take off operation is not detected. The gear-shift event may be an up-shift to a lower ratio gear engagement or a down-shift to a higher ratio gear engagement.

18 Claims, 3 Drawing Sheets

U.S. PATENT DOCUMENTS

| | | | |
|---|---|---|---|
| 6,080,081 A | 6/2000 | Sauermann et al. | |
| 2002/0010534 A1 | 1/2002 | Goodnight | |
| 2003/0119625 A1* | 6/2003 | Bordini | 477/3 |
| 2006/0252597 A1* | 11/2006 | Williams | 477/107 |

FOREIGN PATENT DOCUMENTS

| | | |
|---|---|---|
| WO | 2004062957 A1 | 7/2004 |
| WO | 2005003600 A1 | 1/2005 |
| WO | 2007019029 A | 2/2007 |

OTHER PUBLICATIONS

European Search Report from corresponding application EP 06 78 4161 (Dec. 2, 2009).

* cited by examiner

METHOD AND ARRANGEMENT FOR ADAPTING SHIFTING STRATEGIES IN A HEAVY VEHICLE INCLUDING AN AUTOMATED TRANSMISSION AND EXPERIENCING A PTO LOAD

The present application claims the benefit of U.S. Provisional Application No. 60/596,209 filed Sep. 8, 2005. Said application is expressly incorporated herein by reference in its entirety.

BACKGROUND AND SUMMARY

The present invention relates to adapting a control strategy for an automated transmission of a heavy commercial vehicle based on the active/inactive state of an imposed power take offload.

Heavy commercial vehicles such as overland trucks and buses are known to employ automatic manual transmissions (AMT) that are based on preprogrammed routines. One of the problems in controlling an AMT, however, is attributable to the power consumption by a power take off (PTO). A PTO can typically be classified as a PTO upstream or downstream of the master clutch. In general, a PTO that is upstream of the master clutch can take power from the vehicle's engine regardless of the state of engagement of the transmission via the master clutch. A PTO that is located downstream of the master clutch is typically used when the vehicle is stationary. Use of a downstream PTO often involves placing the gearbox in neutral so that the vehicle wheels are not drivingly engaged to the transmission. However, there are cases when a downstream, transmission mounted PTO is used while the vehicle is in motion.

PTOs are known to impose significant load on the vehicle's engine. Exemplary PTOs use engine power to drive hydraulic pumps that can be activated for such things as mixing applications (concrete trucks) or causing motion of a bed on the truck such as in the case of dump trucks and flat-bed haulers.

Similarly, PTOs may be used to power spreaders such as those used to broadcast salt or sand on icy roads, or to power associated trailer components such as compartment refrigeration units. While these examples are not exhaustive, they do serve to exemplify PTO loads of significant magnitude which can appreciably compromise the driving power available from the engine for the drive wheels, and which often causes undesirable disturbances to automated transmission programs that do not take their intermittent influences into account. For purposes of comparison, these significant PTO loads can be compared to less influential engine loads imposed by such power consumers as cooling fans and air conditioning compressors. As an example of the potential drag that a PTO can impose on the vehicle's engine, it is not uncommon for PTOs to siphon off engine torque on the order of 5 to 3000 Nm. An example of a PTO that requires on the order of 3000 Nm is a fire truck that operates a water pump and an example of a PTO that requires on the order of 5 Nm is the drag imposed by a small refrigeration device.

The present invention appreciates the fact that transmission control routines that do not take into consideration whether or not a significant PTO load is imposed on the vehicle's engine will experience degradation in performance when the PTOs are operational. For example, if the PTO loads are of such magnitude that the engine can not compensate therefore by increased engine speed, there will be an effective reduction in power available for driving the vehicle. The strategy must, however, appreciate that the behavior of the PTO-loaded engine is not that of a smaller engine, but is in fact a unique behavior of the particular engine whose power is divided between a PTO of significant drag and the drivetrain.

Still further, it has been appreciated that it can be difficult to adjust a transmission when the PTO is engaged while the vehicle is in motion; therefore, one of the aspects of the present invention has as a goal to provide a solution where downshift information is used to adapt the transmission controls. When the engine is enabled to supply a certain amount of torque to the driveline, an increase in engine speed is expected when the master clutch is disengaged. With a PTO engaged, the engine speed increases when the master clutch is disengaged, but the magnitude of the increase in engine speed is less than the increase in engine speed without a PTO load. Thus, it is desirable to consider the additional load of the PTO when programming gear shifting strategies.

This can be contrasted to the solution of U.S. Pat. No. 5,582,069 in which PTO load detection is limited to up-shift situations where engine deceleration is analyzed when the gears are decoupled for an up-shift to a lower gear ratio engagement and the engine is defueled. The disclosure of U.S. Pat. No. 5,582,069 is expressly incorporated herein by reference in its entirety.

The present invention has two primary heretofore unrealized functions, with associated benefits. The first is the manner in which it is determined whether the PTO is operating. This is accomplished by comparing torque that is available to power the drive wheels of the vehicle to a total torque that is being generated by the engine. When the difference is greater than a nominal amount, that difference approximates the torque attributable to the PTO's activity. In practice, a nominal amount of torque consumption must be allowed for such things as engine friction loss, oil pumps, air-conditioning compressors and the like. These torque consumption amounts, however, will be substantially smaller than that of a PTO for carrying out such activities as cement mixing, bed dumping or garbage compaction. The primary benefit of using this manner for determining the presence of an active PTO load is that it can be measured at essentially anytime the engine of the vehicle is operating, and is not limited to such narrow time frames as in U.S. Pat. No. 5,582,069 where PTO load detection is limited to up-shift situations in which the gears are decoupled and the engine is defueled.

The second primary new function of the presently disclosed method and arrangement is the fact that certain gearshift events are controlled to occur at higher engine speeds when it is detected that the PTO is operating. The primary events include, but are not limited to up-shifts and downshifts. The underlying concept is that the PTO is consuming a certain amount of torque that at the particular engine speed would otherwise be available for engine acceleration. Therefore, the engine speed is increased an amount that compensates for the PTO's torque consumption. This is important in an up-shift event were the vehicle operator will want approximately the same amount of available drive wheel acceleration after the shift is completed whether or not the PTO is functioning. In this way, the claimed method and arrangement helps to make the existence of the PTO and its working state more transparent to the driver. Where possible, the performance of the vehicle will be maintained because the engine speed at which the up-shift occurs is higher when the PTO is operating. This is also important in a down-shift event where the engine must be sped up for engaging the higher ratio gear when the gear-shift is completed. As before, upon completion of the gear shift, the operator will want similar responsiveness; i.e. drive wheel acceleration responsiveness regardless of whether or not the PTO is engaged. Therefore, here again, the speed of the engine at which the down-shift event occurs is commensurately adjusted upwardly when the PTO is active.

In summary, the solutions of the present disclosure enjoy benefits over known methods and arrangements in that the operational state of the PTO can be assessed when in the power mode and the result is an upward adaptation of the engine speed at which certain gear-shift events are affected.

BRIEF DESCRIPTION OF THE DRAWINGS

The accompanying drawings variously illustrate aspects of the presently disclosed inventions. It should be appreciated that the illustrated embodiments are exemplary only, and do not serve as limitations to the protection. The drawings do, however, constitute part of the disclosure of the specification, and thereby contribute to, and provide support for the inventions. In the figures.

DETAILED DESCRIPTION

The presently disclosed invention(s) relate to modifying the shifting of an AMT so that it accommodates the additional loading of a PTO.

Figure 1:
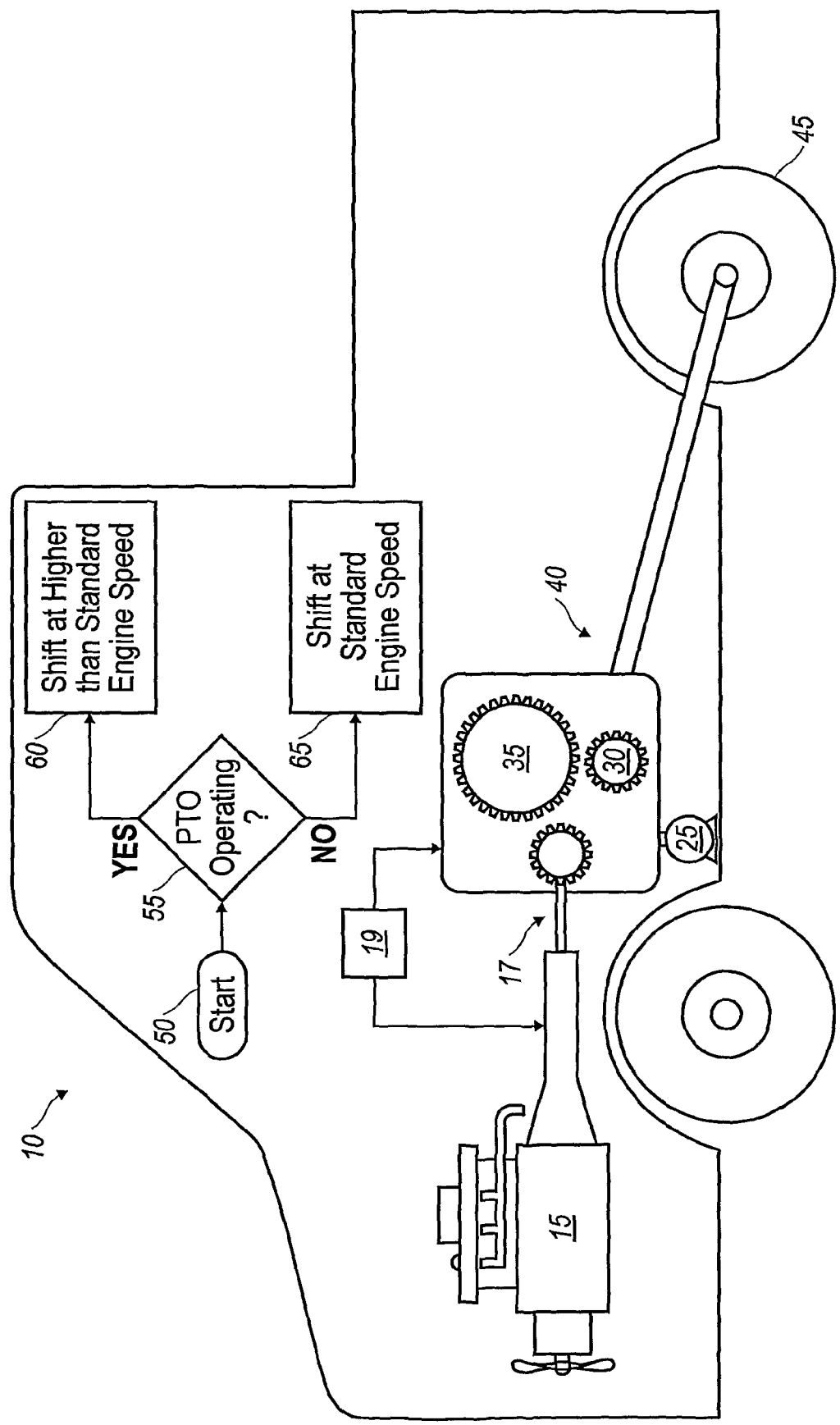
FIG. 1 is a schematic indicating an AMT equipped heavy vehicle, together with an inset flowchart illustrating a method that considers PTO operational status in the determination of engine speed to be affected for shift events

In at least one embodiment and as generally illustrated in FIG. 1, the invention takes the form of a heavy vehicle 10 powered by an internal combustion engine 15. An automated manual transmission 40 and a power take off 25, that when operating, imposes a torque-consuming load on the engine 15. A programmable microprocessor-based electronic control unit 19 is also carried on the vehicle 10 and is programmed to initiate (start block 50) the determination, when the engine 15 is in a power mode, of whether operation of the power take off 25 is occurring (decision block 55) and to responsively cause at least one gear-shift event to occur at a higher engine speed when power take off operation is determined (block 60) than when power take off operation is not determined (block 65).

Figure 2:
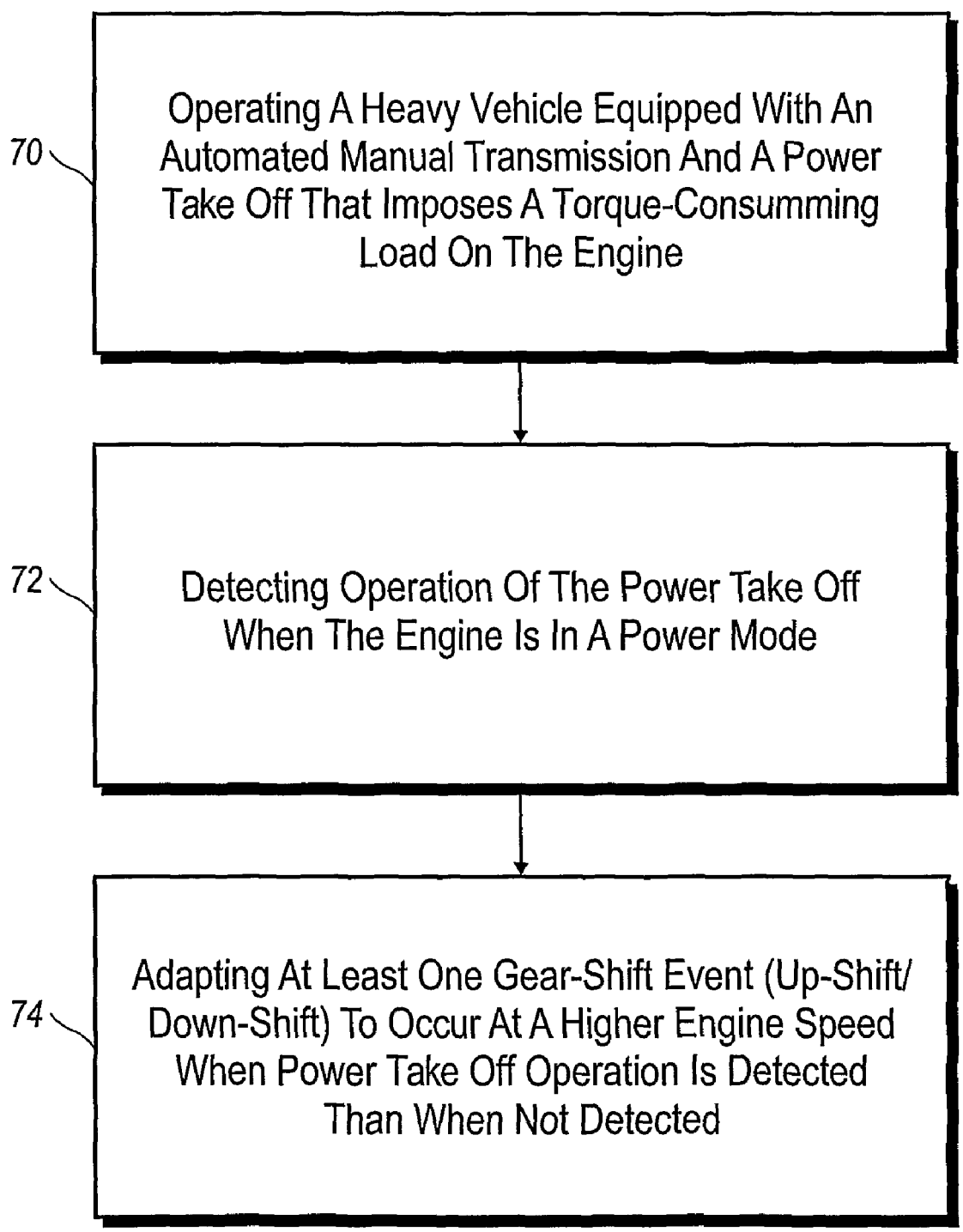
FIG. 2 is a flowchart illustrating an exemplary embodiment of the invention taking the form of a method for adapting gear-shift events under the influence of whether or not a PTO is active or inactive.

In an alternative embodiment, the invention takes the form of a method for adjusting shift characteristics of the transmission of a heavy vehicle that is powered by an internal combustion engine 15, is equipped with an automated manual transmission 40 and has a power take off 25 that when operating, imposes a torque-consuming load on the engine (see block 70 of FIG. 2). It should be appreciated that the transmission 40 is classified as automated which is taken to include both semi-automatic and fully automatic manual transmissions. Exemplarily, these automated transmissions are essentially manual transmissions that have been automatized to a certain degree.

Operation of the power take off is detected when the engine of the vehicle is in a power mode (block 72 of FIG. 2). This terminology is used to describe the situation in which the engine is being fueled, as opposed to defueled as is the case in U.S. Pat. No. 5,582,069. Following detection of the PTO's active state, a following gear-shift event is adapted to occur at a higher engine speed than if the power take off were not detected as being in an operating state (block 74 of FIG. 2).

According to the above-described adaptation, the gear-shift event is affected at an engine speed that is approximately five to twenty-five percent higher than when power take off operation is not detected. The engine speed increase is commensurate with the relative amount of the engine's power that the PTO 25 consumes. Below approximately five percent, the effect of such a small PTO is negligible. For PTO's that consume substantially more than twenty-five percent of the torque capability of the engine, PTO activity will normally be limited to situations in which the vehicle is stationary, such as the case with a pumper-truck in which the truck is typically driven to a fire site, parked, and a substantial entirety of the engine's output is then diverted to the PTO.

Accordingly, the power take off load is approximately quantified as a torque value equal to a difference between an engine-generated amount of torque available for vehicle acceleration and an estimated amount of engine-generated torque. The torque being applied at the drive wheels 45 is equal to the engine's angular acceleration times the engine's known rotational inertia because of the direct connection affected therebetween when a particular gear (30 vs. 35) is engagement. The estimated engine-generated torque can be calculated in a number of different ways, but the example referred to herein is based on the amount of fuel that is currently being supplied to the engine 15. Based on current fuel flow, the total amount of torque that the engine 15 is producing can be estimated based on calculation or from a look-up table. In any event, discounting minor torque losses attributable to system friction and nominal accessories such as oil pumps and the like, the torque diversion to power the PTO can be calculated as the difference between the estimated amount of engine-generated torque and the amount of torque available for vehicle acceleration.

In another embodiment, the invention takes the form of a method for changing the gear shifting parameters in a heavy vehicle 10 with an automated manual transmission 40 based on an added PTO load. The method comprises comparing a measured engine speed change over time ratio to complete a downshift to previously stored ratios. If the ratio is different than expected, the transmission control unit modifies the shifting parameters for selecting a starting gear, upshifting to a higher gear 30 with lower ratio, and downshifting to a lower gear 35 with higher ratio. The process is repeated for every downshift performed by the vehicle to generate a better estimate for the PTO load. Since the PTO load takes away power from the engine, the transmission shifting must be modified to consider this loss.

In still another embodiment, the angular acceleration of the engine is multiplied by the engine inertia and is compared to the torque as indicated by an engine control unit 19 that the engine 15 is producing. If angular acceleration multiplied by engine inertia is less than torque supplied by the engine 15, then the presence of a PTO 25 is sensed. Furthermore, a computed torque required to drive the PTO 25 can be calculated by taking the torque that the engine controller 19 indicates as being generated and subtracting the measured angular acceleration multiplied by the inertia of the engine 15.

In yet another embodiment, the method for adjusting shift characteristics of the transmission 40 involves measuring the angular acceleration of the output shaft 17 of the engine 15, computing the torque by multiplying the angular acceleration by a known value of the engine's rotational inertia, comparing the computed torque with the estimated torque value as generated by the engine control unit, and adjusting the shift characteristics of the transmission in response to the comparison of the computed torque with the estimated torque. Further, the method involves increasing the engine speed at which an upshift or downshift occurs when the PTO load is detected based on having an estimated torque that is less than the computed torque. Preferably, the adjustment to the engine speed occurs in a proportional relationship to the ratio of estimated torque to computed torque.

In further still another embodiment, the method for adjusting shifting characteristics of the transmission 40 of a heavy vehicle 10 considers the normal shifting characteristics when the heavy vehicle 10 is driven under the same circumstances without a PTO load. The shifting is adjusted in response to the detected PTO load. While the shifting characteristics of a heavy vehicle under the same circumstances produces skip shifting in the transmission, the type of skip shifting is changed when a PTO load is detected. Skip shifting refers to the control of the transmission to skip a certain number of gears and only engage a later gear and no gears between the currently engaged and the gear to be engaged. For example, a skip shift occurs between gears 2 and 4. In performing up shifts, the number of skippable gears is reduced when a PTO load is detected as compared to normal shifting characteristics (no PTO load is present). While if the transmission is performing downshifting, a larger number of gears can be skipped. Likewise, the detection of the PTO load can be through one of the above described techniques. Other shifting characteristics may be changed as well as indicated above in relation to engine speed and the changes can be proportionally linked as well.

In another embodiment yet, the starting gear is modified in response to a PTO load. When a PTO load has been detected, the next time a starting gear is required the transmission control unit implements a lower starting gear than required without a PTO load. The above described procedures allow the engine to produce enough torque to consider the additional PTO load. Other considerations that may also be included are vehicle load, road inclination, driver request for torque and the presence and activity of other accessories.

If the starting gear is too high, excessive wear will result to the clutch; thus, it is preferred that a lower gear be used which further results in increased driver comfort. The measurement of imposed torque, exemplarily by a PTO, occurs during downshifting so as to remove the influence of vehicle load.

As described hereinabove, a PTO 25 which is operational constitutes an engine power consumer that should be considered in order to make automated transmission shifting more comfortable, efficient, faster, and at appropriate gear ratios. In order to take into account the additional load of the PTO, it is necessary to calculate the imposed load or otherwise quantify the load. This can be performed either using conventional sensors onboard a given vehicle, or through specifically added sensors. Some of the standard sensors include the input shaft speed sensor, engine speed sensor, and output shaft speed sensor. Another method would be to use a transmission input shaft torque sensor or to measure the torque at the PTO.

The PTO load if measured through conventional sensors involves using the engine and transmission control units to measure time, engine torque, angular acceleration of the engine, and engine speed.

These measurements allow the transmission 40 to respond to a desired torque which is determined, and then the engine 15 is adapted to produce the needed torque. The determination of the desired torque of the engine 15 in one embodiment is through measurement of depression of the accelerator pedal. Other ways of measuring desired torque, include other driver input signals such as might be found on the steering wheel or other location accessible to the driver. While in one embodiment the measurement of desired torque is directly taken from the input by the driver, other secondary measurements might be performed as well. Furthermore, the engine is adapted to meet the currently demanded torque which is determined from the continual monitoring of the torque demands. In one embodiment, the PTO load is calculated using a measured angular acceleration of the engine multiplied by the engine inertia.

Figures 3, 4:
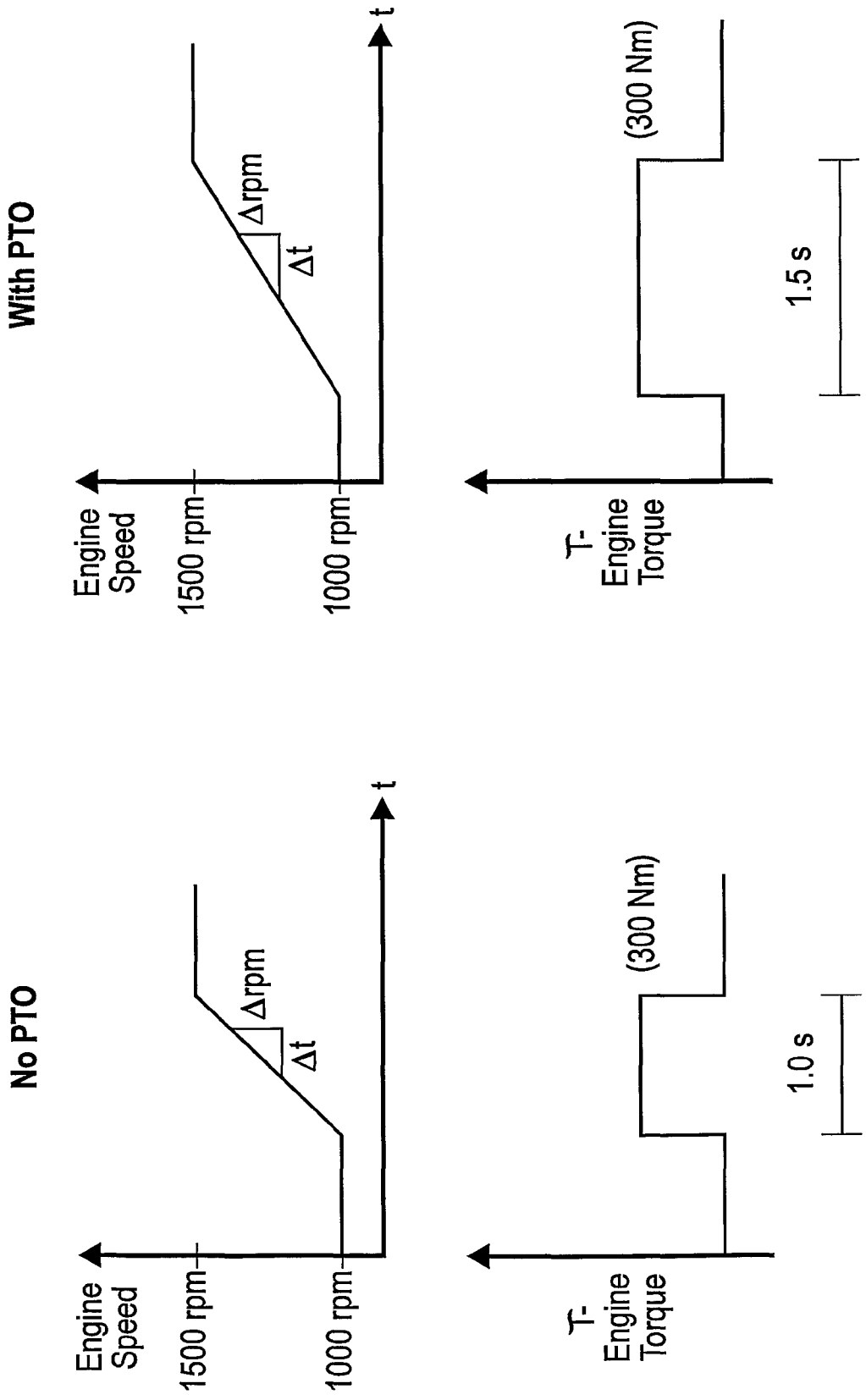
FIG. 3 illustrates, using two stacked graphs, an engine's acceleration when an associated PTO is inactive and imposing essentially no load upon the engine.
FIG. 4 illustrates, using two similar stacked graphs, an engine's slower (1.5 seconds vs. 1.0 seconds) acceleration when an associated PTO is active and loading the engine.

Accordingly, before such a load calculation can occur, the vehicle must have performed a downshift. In one embodiment when the vehicle begins a downshift, the engine speed is measured along with the time being marked at which the gear shifting starts. Then, once the downshift is complete, the new speed is measured and the completion time is marked again with the difference in the two time marks constituting a corresponding downshift time or period. FIG. 3 illustrates a typical shift period for a non-PTO loaded (unloaded) system and FIG. 4. illustrates a shift period for a corresponding PTO loaded situation. In at least one embodiment, the angular acceleration of the engine is measured and utilized in calculating the PTO's influence.

The engine speed along with output torque of the engine is measured from the engine control unit (ECU). A calculation is performed to obtain a value for the change in engine speed over the time it took to complete the gearshift. An alternative is to calculate the torque over engine inertia. The engine inertia is a fixed value that is known permanently by the ECU or transmission control unit (TCU). The ratios of engine speed over time or torque over engine inertia are entered into the memory of the TCU. If the ratio is different than the expected ratio based on prior measurements of the downshift, then the TCU will update the previously known ratio with the new ratio. When a change in the speed over time or torque over engine inertia ratio is indicated, a PTO load is present.

If the value of the ratio is substantially smaller than the previously recorded ratio, then a new PTO load is present. If the ratio is substantially larger than the previously recorded ratio, then a PTO load has been removed. The updating of the ratio may take several cycles before the change in the ratio is small. The TCU continues to update the information each time a downshift is performed. The ratio can be used to implement new shifting strategies for the TCU in both upshifting and downshifting in order to improve driver comfort, correct gear selection, and shorter shift times. These ratios are also used in selecting a start gear.

In one embodiment, the determination of the presence and/or magnitude of the PTO load is detected through the use of angular acceleration of the engine. When a downshift occurs, the angular acceleration of the engine is measured while the master clutch is disengaged. The presence of a PTO load is found when the measured angular acceleration multiplied by a known value of the rotational inertia of the engine is less than the torque output of the engine. The rotational inertia in a preferred embodiment is a known value stored in the system. In another embodiment, the magnitude of the PTO load can be quantified by subtracting the product of the rotation inertia and the angular acceleration from the torque produced by the engine. The torque produced by the engine and quantified by the ECU is an estimated torque produced by the engine.

An example of how this would be used for a start gear selection is when the vehicle has been in motion without the burden of the PTO load, and then the PTO engages and its load is imposed. After this, the vehicle then experiences one or more downshifts that cause the TCU to adapt to the new PTO load. This information causes the TCU to change operating parameters to provide desired characteristics of the transmission. This includes selecting an appropriate start gear when the vehicle makes a stop and later resumes motion. In this context, the vehicle is considered stopped when the motion of the vehicle slows to a point that the starting gear is required to set the vehicle in motion again. The starting gear selection may occur while the engine is running, or after the engine ignition has been switched off and the engine is restarted at a later time. The previous ratios can be used in the selection of a starting gear even if the engine has been turned off because they are stored in memory.

As more downshifts occur while the PTO is engaged, a better estimate is possible of the PTO load. The memory of the TCU is used to store previous ratios, which are compared to the currently measured ratio, hi a preferred embodiment, an average of the previously measured torque values is obtained and the currently measured torque is compared to this average of torque values. However, if there is a large change in the average torque values, only the latest measurement is used for comparison purposes.

The calculation of the PTO load is important because it is used when determining shift characteristics as the vehicle is driven under such additional load. This added information permits proper compensation to be made for the loss of engine torque as a result of the engagement of the PTO. Driving modes in which such compensation is often desired includes take-off (launch), reversing, slow movement, road driving (moderate-speed) and highway driving (high-speed). These conditions exist anytime a gear of the vehicle is selected and motion is caused through the transmission.

The transmission shifting strategy as previously mentioned is modified upon detection of a PTO load, and in a preferred embodiment further modified based on the magnitude of the PTO load. In a preferred embodiment, if the presence of a PTO load is detected, the transmission is caused to shift gears at a higher engine speed than implemented under a no PTO load condition. This enables the engine to provide appropriate torque levels to cover that which is required by the PTO and that which the driver is demanding.

In an exemplary embodiment, during an upshift the current gear remains engaged for a longer period of time than required under a no PTO load condition with other conditions being equal (see FIGS. 3 and 4 for comparative illustration). Likewise during a downshift, the current gear remains engaged a shorter period of time as compared to a normal shifting profile.

An additional reason for the modification of the shift control strategy is that upon disengagement of the driveline, the engine must be controlled so that there is substantially no net torque in the driveline, which can be on the order of five percent of the maximum engine torque. As an example, consider a PTO load of ten percent and a no net torque cutoff for the driveline of five percent. When disengagement of the driveline occurs now, it will be at a fifteen percent torque load instead of the previous five percent torque load. Thus, at the time of disengagement of the master clutch, the engine must be in a state where it is producing additional torque as compared to the state without a PTO load.

A further embodiment makes use of a signal from a driver operated switch indicating the presence of a PTO load. In one exemplary embodiment, the presence of a PTO has been detected using one of the above procedures and the transmission shifting characteristics appropriately modified. Upon manipulation of the switch to cause the PTO to be switched to the inactive state, the transmission shifting strategy is modified so that it resumes normal operation without consideration of the PTO load. Thus, this procedure bypasses the wait time to modify the shift characteristics until completion of a downshift. If the transmission is currently operating in a normal shifting mode (no PTO load considered) and a PTO engagement switch is activated, the transmission controller is modified such that the last previously used modifications are implemented. Thus, if the last operation of the PTO indicated that it was drawing twenty percent of the maximum engine torque, the control parameters of the transmission upon the next activation of PTO-engagement switch will cause the transmission to operate under control parameters set for a twenty percent maximum engine torque PTO load.

In a preferred embodiment, the method for adjusting shift characteristics of the transmission for a heavy vehicle includes comparing the computed torque, preferably by multiplying the angular acceleration of the output shaft of the engine by a known value of rotational inertia of the engine, with an estimated torque value as generated by the ECU and adjusting the shift characteristics in response to the comparison of the computed torque with the estimated torque. The presence of a PTO load is detected when the estimated torque is less than the computed torque. When the presence of the PTO is detected then the point at which an upshift or downshift occurs will be at a higher engine speed as compared to a previous value or the normal shifting mode of the transmission. Preferably, the increase in engine speed for the shifting is proportional in relation to the difference between the estimated torque value and the computed torque.

In another embodiment, the shifting characteristics of the transmission are adjusted in response to the PTO load by changing the gear selection characteristics of the transmission. Many control units for transmissions make use of the ability to skip gears in a normal shifting mode. As described above, skip shifting refers to the situation in which gears are skipped that would have been engaged if the gears were sequentially engaged. This is desirable because transmissions for heavy vehicles often are provided with numerous gears that may not need to be engaged under certain driving conditions. A well-trained driver will often skip gears if the conditions appropriately allow for it. For example, the TCU might cause the gears to change between third and sixth gears under the normal shifting mode. However, when the PTO load is detected, the TCU may decide not to skip shift if the load is large or skip to an intermediate gear, for this example fifth gear. The TCU adjusts the skip shifting of the transmission based on the PTO load that is determined as described above. Thus, the transmission will engage the gears differently while a PTO load is detected by adjusting the gear selection procedure. The gear selection is preferably based upon the magnitude of the PTO load.

While preferred and alternative embodiments of the presently disclosed solutions are shown and described herein, such embodiments are provided for example purposes only. Numerous variations, changes and substitutions will occur to those skilled in the art without departing from the bounds of the disclosure. Accordingly, it is intended that the patent protection claimed be limited only by the spirit and scope of the claims, themselves.

What is claimed is:

1. A method for adjusting shift characteristics of a transmission of a heavy vehicle, the method comprising:
   operating a heavy vehicle that is powered by an internal combustion engine equipped with an automated manual transmission and a power take off, the power take off, when operating, imposes a torque-consuming load on the engine;

detecting operation of the power take off when the engine of the vehicle is in a power mode; and adapting at least one gear-shift event to occur at a higher engine speed when power take off operation is detected than when power take off operation is not detected.

2. The method as recited in claim 1, comprising affecting the at least one gear-shift event at an engine speed that is approximately five to twenty-five percent higher than when power take off operation is not detected.

3. The method as recited in claim 1, wherein the at least one gear-shift event is an up-shift to a lower ratio gear engagement.

4. The method as recited in claim 1, wherein the at least one gear-shift event is a down-shift to a higher ratio gear engagement.

5. The method as recited in claim 1, wherein the power take off load is approximately quantified as a torque value equal to a difference between an engine-generated amount of torque available for vehicle acceleration and an estimated amount of engine-generated torque.

6. The method as recited in claim 5, wherein the estimated amount of engine-generated torque is based on a sensed characteristic at the engine.

7. The method as recited in claim 5, wherein the amount of torque available for vehicle acceleration is approximated by multiplying a corresponding angular acceleration of the engine by the engine's rotational inertia.

8. The method as recited in claim 7, wherein the estimated amount of engine-generated torque is based on a corresponding amount of fuel being injected into the engine.

9. The method as recited in claim 8, wherein the power take off load is approximately equal to between five and twenty-five percent of the amount of torque available for vehicle acceleration.

10. A heavy vehicle comprising:
an internal combustion engine that powers the heavy vehicle;
an automated manual transmission;
a power take off that when operating imposes a torque-consuming load on the engine; and
a programmable microprocessor-based electronic control unit programmed to determine, when the engine is in a power mode, that operation of the power take off is occurring, and to responsively cause at least one gear-shift event to occur at a higher engine speed when power take off operation is determined than when power take off operation is not determined.

11. The heavy vehicle as recited in claim 10, wherein the electronic control unit is further programmed to affect the at least one gear-shift event at an engine speed that is approximately five to twenty-five percent higher than when power take off operation is not detected.

12. The heavy vehicle as recited in claim 10, wherein the at least one gearshift event is an up-shift to a lower ratio gear engagement.

13. The heavy vehicle as recited in claim 10, wherein the at least one gearshift event is a down-shift to a higher ratio gear engagement.

14. The heavy vehicle as recited in claim 10, wherein the power take off load is approximately quantified as a torque value equal to a difference between an engine-generated amount of torque available for vehicle acceleration and an estimated amount of engine-generated torque.

15. The heavy vehicle as recited in claim 14, wherein the estimated amount of engine-generated torque is based on a sensed characteristic at the engine.

16. The heavy vehicle as recited in claim 14, wherein the amount of torque available for vehicle acceleration is approximated by multiplying a corresponding angular acceleration of the engine by the engine's rotational inertia.

17. The heavy vehicle as recited in claim 16, wherein the estimated amount of engine-generated torque is based on a corresponding amount of fuel being injected into the engine.

18. The heavy vehicle as recited in claim 17, wherein the power take off load is approximately equal to between five and twenty-five percent of the amount of torque available for vehicle acceleration.

* * * * *